United States Patent
Poo et al.

(10) Patent No.: US 8,103,845 B2
(45) Date of Patent: Jan. 24, 2012

(54) DATA STORAGE DEVICE USING TWO TYPES OF STORAGE MEDIUM

(75) Inventors: Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 438 days.

(21) Appl. No.: 12/279,204

(22) PCT Filed: Jan. 24, 2007

(86) PCT No.: PCT/SG2007/000020
§ 371 (c)(1),
(2), (4) Date: Aug. 13, 2008

(87) PCT Pub. No.: WO2007/094742
PCT Pub. Date: Aug. 23, 2007

(65) Prior Publication Data
US 2009/0067303 A1 Mar. 12, 2009

(30) Foreign Application Priority Data
Feb. 14, 2006 (SG) .............................. 200600867-6

(51) Int. Cl.
*G06F 12/00* (2006.01)
(52) U.S. Cl. ..................... 711/163; 711/E12.001; 713/1
(58) Field of Classification Search .................. 711/163, 711/112, 170, E12.001
See application file for complete search history.

(56) References Cited

U.S. PATENT DOCUMENTS

| | | | |
|---|---|---|---|
| 7,669,019 B2 * | 2/2010 | Fujibayashi et al. | 711/161 |
| 2002/0083280 A1 | 6/2002 | Naitoh et al. | |
| 2004/0049643 A1 | 3/2004 | Alavarez et al. | 711/162 |
| 2004/0139255 A1 | 7/2004 | Cheng | |
| 2005/0172074 A1 | 8/2005 | Sinclair | |
| 2008/0086585 A1 * | 4/2008 | Fukuda et al. | 711/100 |
| 2008/0117548 A1 * | 5/2008 | Azuma et al. | 360/135 |

FOREIGN PATENT DOCUMENTS

| | | |
|---|---|---|
| GB | 2316510 A | 2/1998 |
| JP | 2001-296974 | 10/2001 |
| WO | WO 2005/003952 | 1/2005 |

OTHER PUBLICATIONS

English translation of the Japanese Examination Report dated Jul. 15, 2010 issued in corresponding Japanese Application No. 2008-555198.
English translation of the Chinese Examination Report dated May 5, 2010 issued in corresponding Chinese Application No. 200780005192.3.
International Search Report dated Jul. 12, 2007, issued in corresponding PCT Application No. PCT/SG2007/000020.
Written Opinion of the International Searching Authority dated Jul. 12, 2007, issued in corresponding PCT Application No. PCT/SG2007/000020.
European Search Report mailed Feb. 24, 2011 in corresponding European Patent Application No. 07 701 179.9-1245.

* cited by examiner

*Primary Examiner* — Pierre-Michel Bataille
(74) *Attorney, Agent, or Firm* — Ostrolenk Faber LLP

(57) ABSTRACT

A data storage device includes two data storage media: both a hard disk and a non-volatile solid state memory device, such as a flash memory. Data received by the data storage device for storage is stored both in the hard disk and the flash memory. Since the data storage is duplicated, if a problem arises with retrieving data from one of the hard disk, the data can be retrieved from the flash memory.

7 Claims, 4 Drawing Sheets

DATA STORAGE DEVICE USING TWO TYPES OF STORAGE MEDIUM

CROSS REFERENCE TO RELATED APPLICATIONS

The present application is a 35 U.S.C. §371 National Phase conversion of PCT/SG2007/000020, filed Jan. 24, 2007, which claims benefit of Singapore Application No. 200600867-6, filed Feb. 14, 2006, the disclosure of which is incorporated herein by reference. The PCT International Application was published in the English language.

SUMMARY OF THE INVENTION

The present invention relates to a data storage device which makes use of two data storage media of different types.

BACKGROUND OF THE INVENTION

Great developments have been underway in recent years in the field of data storage devices. The seminal patent application PCT/SG00/00029 introduced the concept of a data storage device which includes a housing having an integral USB plug and within the housing a non-volatile solid state (i.e. integrated circuit-type) memory device, such as a flash memory. The first such devices, launched in late February 2000 had a capacity of 8 MB, and much higher capacities are available now.

In parallel to this, there has been rapid improvement in hard disk technology, and portable data storage devices of at least several GB are now available, having a size comparable to the solid-state portable data storage devices discussed above.

SUMMARY OF THE INVENTION

The present invention aims to provide a new and useful data storage device, and algorithms performed by such a device.

In general terms, the present invention proposes that a data storage device includes two data storage media: both a hard disk and a non-volatile solid state memory device. Data received by the data storage device for storage is stored both in the hard disk and the non-volatile solid state memory device. Since the data storage is duplicated, if a problem arises with retrieving data from one of the storage media, the data can be retrieved from the other.

Note that hard disks and non-volatile solid state memory devices are vulnerable to different sorts of environmental damage. Thus, data storage device according to the invention is less vulnerable than to damage than a data storage device using only a single data storage medium. This is because in the data storage device proposed by the invention the data has a greater likelihood of survival in at least one of the two data storage media.

The data storage device is for connection to a host which controls it using read and write commands, for example according to first driver stored and run in the host. The write and read commands the host generates and transmits to the data storage device may be in a conventional format. In this case, the host does not have to "know" that the data it sends for storage is stored in duplicate storage media. In response to a write command, the data storage device writes the data to both the data storage media. In the case of a standard read command, the data storage device retrieves the data from the hard disk, and sends it to the host.

However, in the case that there is a need to retrieve the data from the flash memory, the data storage device can be used in combination with second driver software (e.g. running on a different host to which the portable storage device is connected at that time) to retrieve the data from the flash memory. This second driver software may be arranged to generate read commands in a special format which instructs a read operation from the flash memory, instead of the hard disk.

The data storage device may be arranged only to implement the special read commands provided that a security procedure is complied with. For example, a password verification operation may be required.

BRIEF DESCRIPTION OF THE DRAWINGS

An embodiment of the invention will now be described for the sake of example only with reference to the following figures in which.

DETAILED DESCRIPTION OF THE DRAWINGS

Figure 1:
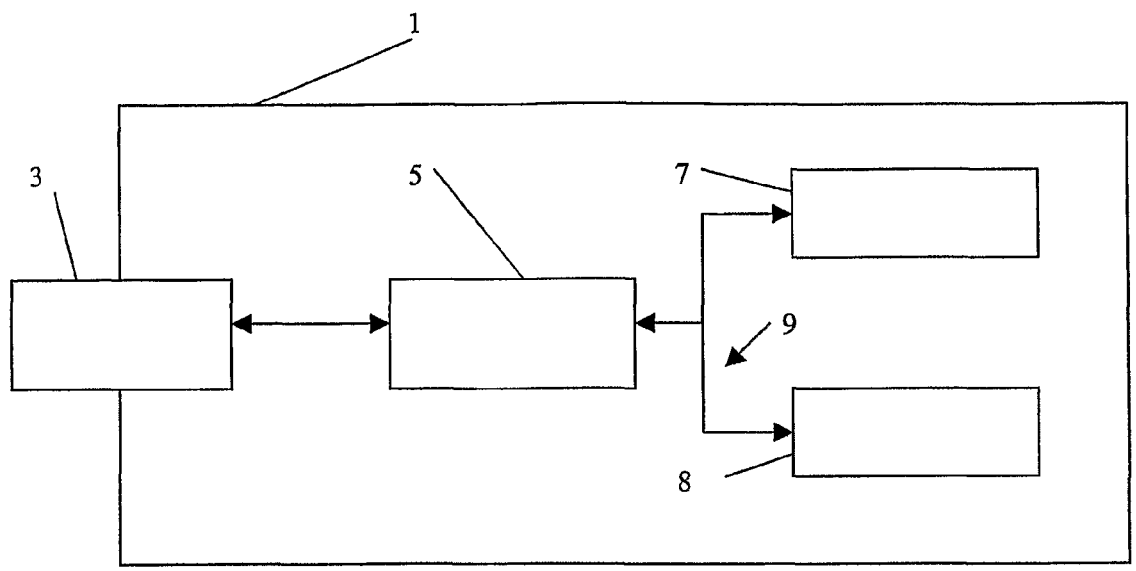
FIG. 1 is a schematic block diagram of the embodiment of the invention.

Referring to FIG. 1, an embodiment of the present invention is a data storage device shown having a housing 1, and a USB interface 3 (such as a USB plug but possibly including a USB interface integrated circuit) fixed to the housing 1. The USB interface 3 is for connection to a host (such as a PC), e.g. by plugging the USB plug into a socket of the host. The USB interface 3 is in communication with a controller 5. The controller 5 itself is communication with a flash memory 7 and a hard disk 8. The housing 1 is preferably small enough for the data storage device to be easily portable, such as in a user's pocket. The housing may indeed be small enough to be hidden within the closed fist of a user.

The hard disk 8 is a "removable hard disk drive", in the sense of being in the class of hard disk drives which are external to the host system. Additionally, the hard disk 8 of the embodiment is optionally removable from the housing 1. This permits the hard disk 8 to be replaced if it is full. Indeed, the hard disk 8 may be one of a plurality of different hard disks which can be inserted into the housing when required. The hard disk 8 is generally present during initialization of the data storage device.

The communication path 9 between the controller 5 and the flash memory 7 and the hard disk 8 includes both one or more data buses and control lines. Between the controller 5 and the hard disk 8 is an interface which may be an SDIO (secure digital input/output) interface which supports a 4-bit data bus, but in alternative embodiments the interface may be any other media interface, such as an IDE (integrated drive electronics) interface.

The embodiment is used in conjunction with first driver software running on a host which generates read and write commands. This first driver software may take a conventional form. As described below, the data storage device reacts to write commands by writing data sent from the host to both the flash memory 7 and the hard disk 8. The data storage device reacts to a read command by reading data from the hard disk 8 and transmitting to the host. Thus, as far as conventional driver software is concerned, the embodiment functions identically to a known data storage device.

However, the data storage device of the invention may also be operated by a second set of driver software to access the data which is in the flash memory 7. The second driver software has capacity to generate a read command which is in a different format from the read command generated by the first driver software, and which the controller 5 recognizes as a command to read data out of the flash memory 7, and to transmit that data out of the data storage device. The controller 5 then performs this operation. The second driver software may optionally be provided on the same host as the first driver software, or alternatively be on a different host to which the embodiment is connected at that time. The second driver software makes it possible to extract stored data even if the hard disk drive 8 is damaged. Thus, if the data storage device is placed in an environment in which the hard disk 8 is damaged, the data it stores may be retrieved from the flash memory 7 if the flash memory 7 is undamaged.

Of course, if the hard disk 8 is removable, then while it is removed, the data in the flash memory 7 may change (e.g. be overwritten) without corresponding changes being made to the data stored on the hard disk 8. Similarly, if the hard disk 8 is replaced with a new blank hard disk, then clearly the new hard disk does not store data duplicating what is already stored in the flash memory 7. In either case, however, these situations arise because of a user's action, and so the user will be aware that the data stored in the flash memory does not duplicate the data on the hard disk 8. Accordingly, in either case, the user will know not to rely on the backup provided by the flash memory 7.

Figure 2A:
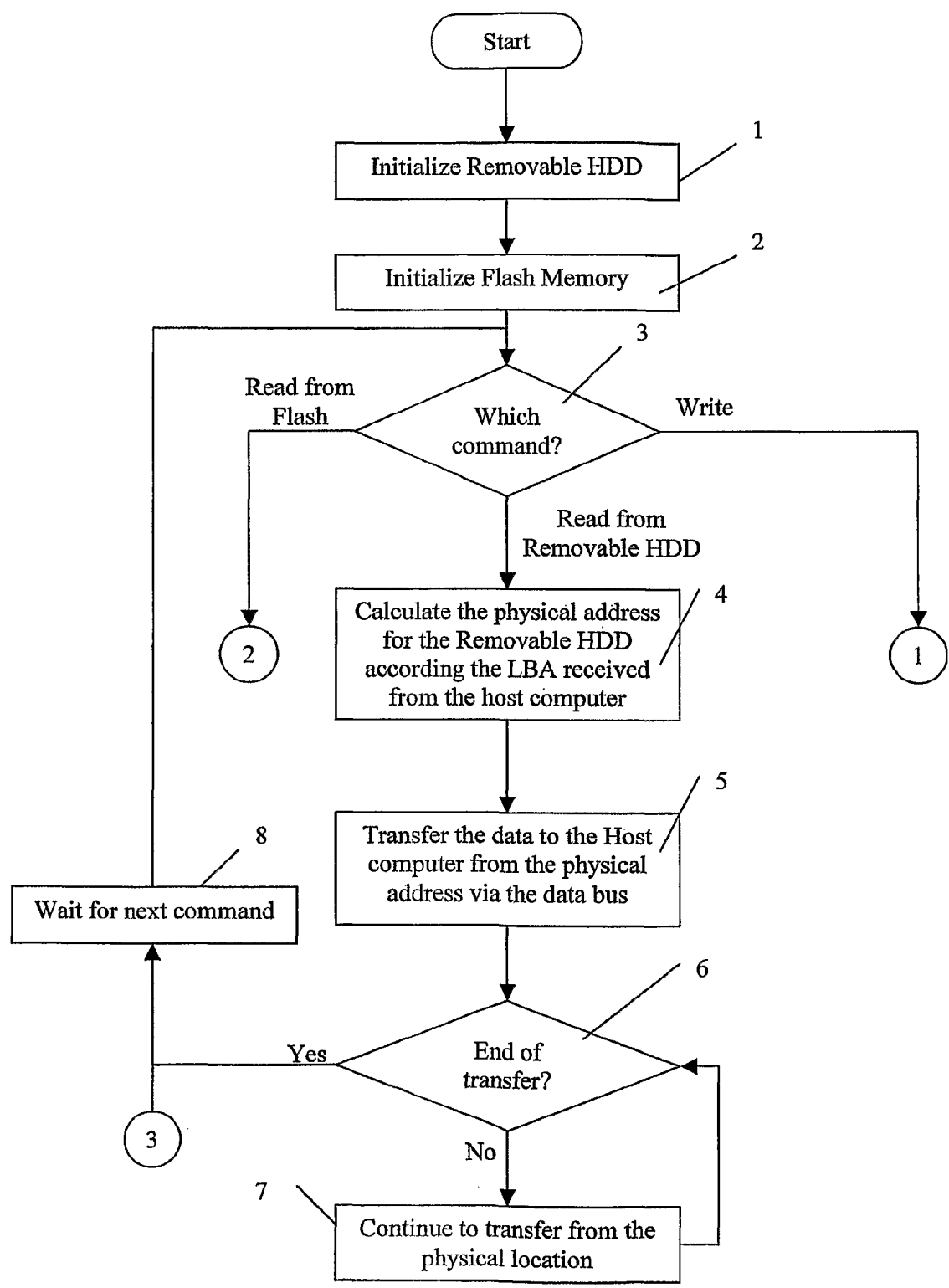
FIG. 2, which is composed of FIGS. 2(a), 2(b) and 2(c), is a flow diagram of the data storage and retrieval process carried out by the embodiment of FIG. 1.
Figure 2:
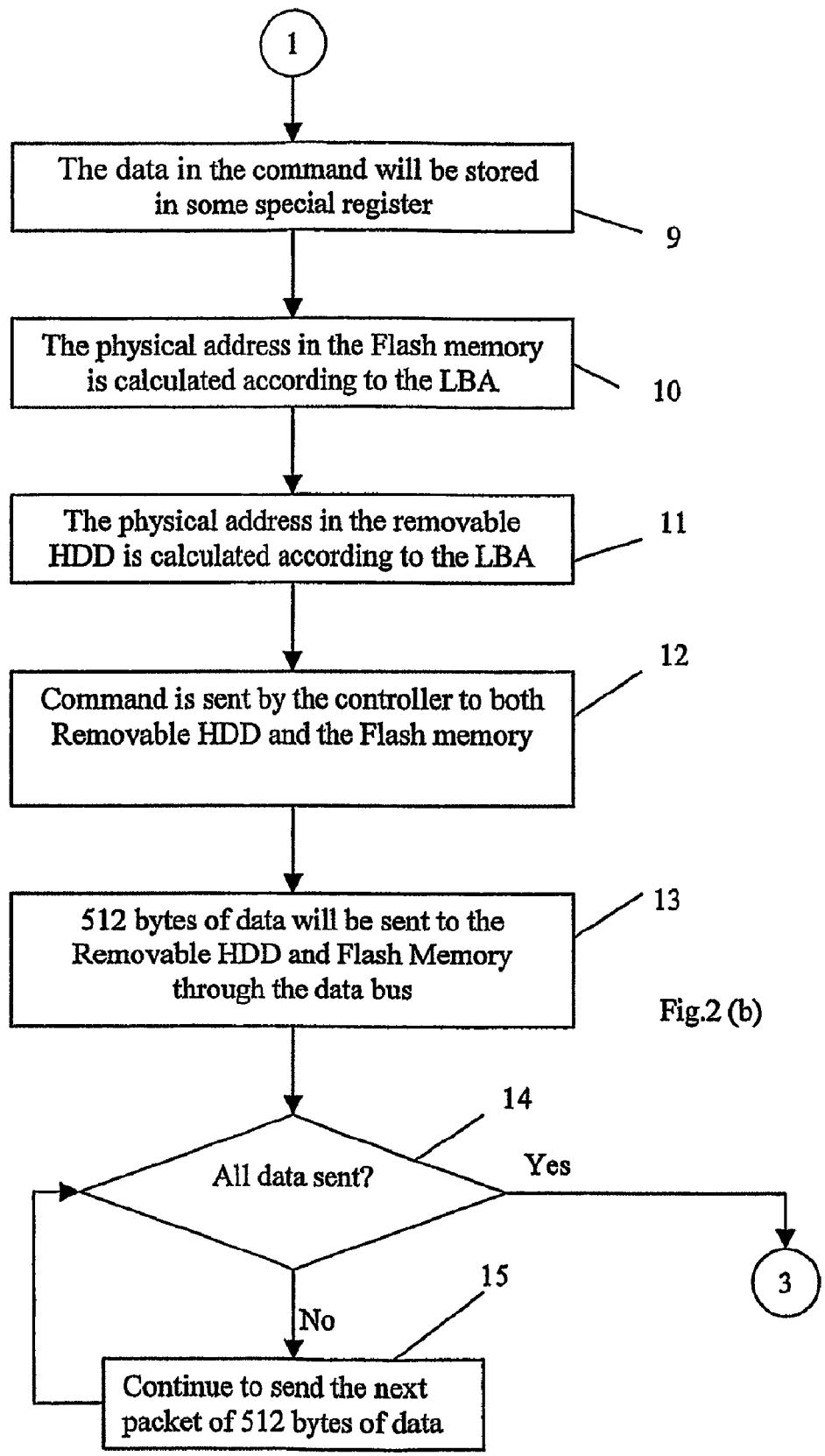

We now turn to a discussion of the algorithm performed by the data storage device, with reference to FIG. 2. The initial section of the algorithm is shown in FIG. 2(a). When the device is powered up an initialization process is performed in which the device initializes the hard disk 8 (step 1), and the flash memory 7 (step 2).

When the device receives a command, in step 3 it then determines whether the command is a write command, a command to read data from the flash memory 7, or a command to read data from the hard disk 8. The default for the read operation is that the data will be read from the hard disk 8, so a read command which arrives without containing a marker indicating that it refers to the flash memory 7, is treated as a read command in respect of the hard disk 8.

If step 3 determines that the received command is a command to read data from the hard disk 8, in step 4 is calculated the physical address in the hard disk 8 corresponding to the logical block address (LBA) contained in the read command. In step 5 the controller 5 uses the control lines and the data bus 9 to send a command to the hard disk 8 to transmit to the controller the data at that physical address, and then the controller 5 transfers data received from the hard disk 8 over the data bus to the external host through the USB interface 3. In step 6 it tests whether this process is complete. If not, it continues the transfer process in step 7, and loops back to step 6. When the determination in step 6 is positive, the method passes to step 8 in which it waits for a new command. When that new command it received, the method passes again to step 3.

If step 3 determines that the received command is a command to write data, the method passes to the portion of the algorithm shown in FIG. 2(b). In step 9 the data in the command is stored in a register, to be written subsequently to the memories 7, 8. The command portion of the write command (i.e. the write command minus the data to be written) is stored separately, for subsequent use in determining where the data should be written.

In step 10, the physical address in the flash memory 7 corresponding to an LBA in the write command is calculated. In step 11, the physical address in the hard disk 8 corresponding to the same LBA is calculated. In step 12, the controller 5 sends a command using the control lines to both the flash memory 7 and the hard disk 8 instructing it to store data. Then controller 5 in step 13 writes 512 bytes of the data received from the host to both the flash memory 7 and the hard disk 8. In step 14, the controller 5 tests whether it has now sent all the data specified by the write command to the memory devices 7, 8. If not, in step 15 the data writing process continues, and the method loops back to step 14. As soon as the determination in step 14 is positive, the writing process is complete, and the method passes back to the section of the flow diagram shown in FIG. 2(a).

Figure 2C:
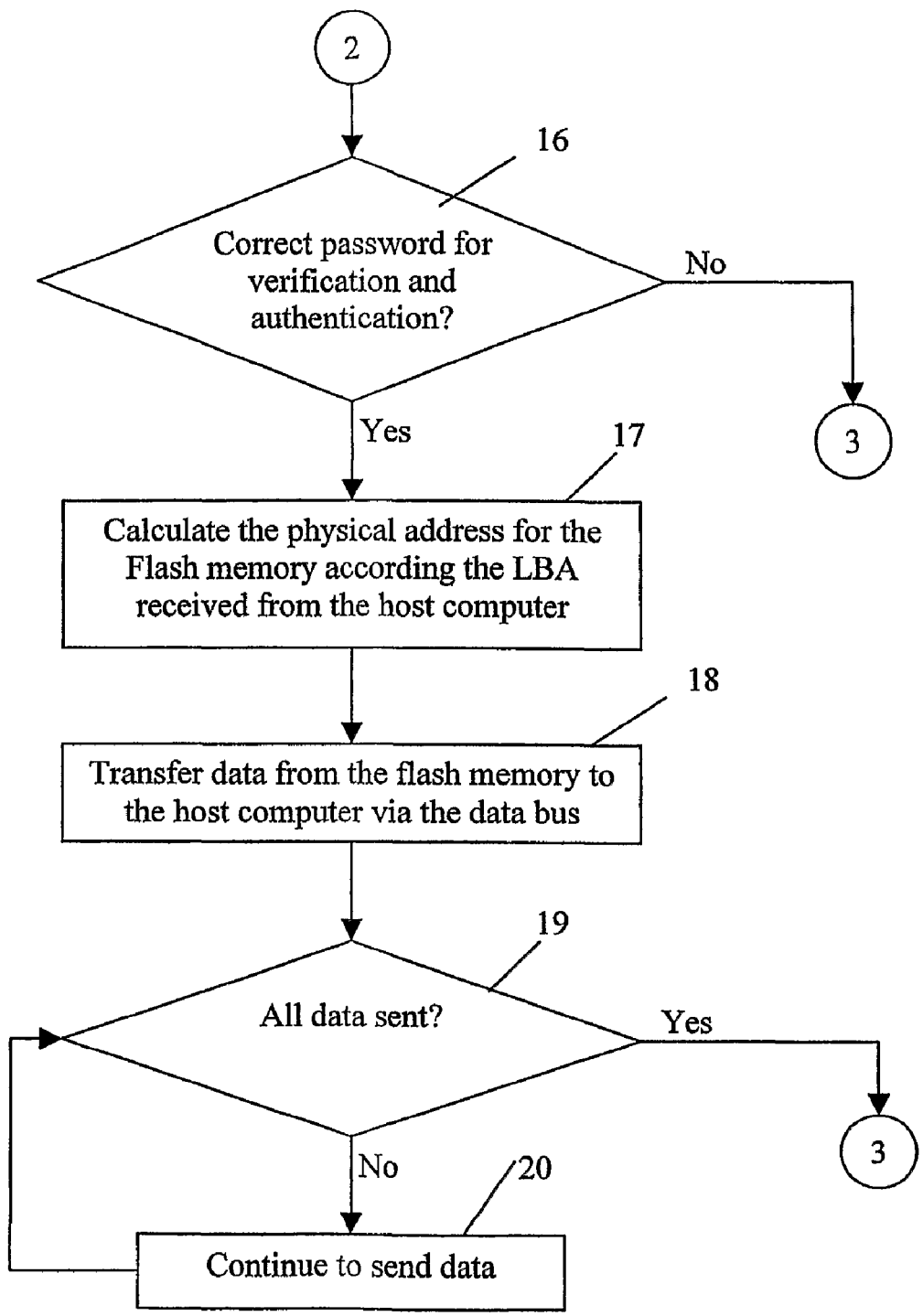

If step 3 determines that the received command is a command to read data from the flash memory 7 (i.e. a command generated by the second driver software), then it passes to the section of the algorithm shown in FIG. 2(c). In a verification step 16 the controller 9 determines whether the read command included certain security information, such as a password. If not, the read operation fails, and the method passes back to FIG. 2(a). Optionally, the password may be stored in a reserved area of the flash memory 7 itself. Alternatively, the password may be stored in the host.

If the verification step 16 is positive, then in step 17 the controller 5 calculates the physical address in the flash memory. In step 18 the controller 5 uses the control lines and data bus 9 to control the flash memory to transmit the data at that physical address to the controller 5 using the data bus, and then the controller 5 transmits the data to the host out through the USB interface 3. In step 19, the controller 5 determines whether all the requested data has been sent. If so, the read operation terminates, and the method loops back to the section of the algorithm shown in FIG. 2(a). Otherwise, the data transfer procedure continues (step 20), looping back to step 19.

Although only a single embodiment of the invention has been described in detail, many variations are possible within the scope of the invention as will be clear to a skilled reader.

What is claimed is:

1. A data storage device which operates in conjunction with either a first driver software or a second driver software comprising:
    (i) an interface for communicating with a host capable of running the first driver software and the second driver software,
    (ii) a hard disk,
    (iii) a non-volatile solid state memory device, and
    (iv) a controller in communication with the interface, with the hard disk and with the non-volatile solid state memory device,
    the controller being arranged:
    (a) upon receiving a write command from the host running the first driver software, to write data received from the host which is specified by the write command, into both the hard disk and the non-volatile solid state memory device, the data being duplicated in both the hard disk and the non-volatile solid state memory device,
    (b) upon receiving a read command from the host running the first driver software, to obtain data from the hard disk, and to transmit the data out of the data storage device through the interface, and
    (c) upon receiving a read command from the host running the second driver software, to obtain data from the non-volatile solid state memory device, and to transmit the data out of the data storage device through the interface,
    wherein the controller is arranged, upon receiving the write command from the host running the first driver software, to send a first command to both the hard disk and the non-volatile solid state memory device, the first command being for instructing both the hard disk and the non-volatile solid state memory device to store the data specified by the write command, and, upon receiving the read command from the host running the second driver software, to send a second command to the non-volatile solid state memory device, the second command being for transmitting data from the non-volatile solid state memory device.

2. A data storage device according to claim 1 wherein the controller is arranged, upon receiving a read command, to determine from the read command whether the read command relates to the hard disk or the non-volatile storage device.

3. A data storage device according to claim 2 wherein, upon determining that the read command relates to the non-volatile storage device, the controller is arranged to initiate a security procedure in which the controller verifies whether security information received from the interface is in accordance with pre-stored security information.

4. A data storage device according to claim 1, wherein the hard disk is removable from the data storage device.

5. A method of retrieving data from a data storage device according to claim 1, the method including establishing electronic communication between the data storage device and the host, the host transmitting commands to the data storage device to cause the host to obtain data from the non-volatile solid state memory, and to cause the data storage device to transmit the data to the host through the interface.

6. A method according to claim 5 further including a step of the host performing a security procedure in relation to the data storage device prior to the data storage device transmitting the data to the host.

7. A method according to claim 6 wherein the security procedure employs a password.

* * * * *